(12) United States Patent
Deane (10) Patent No.: US 10,888,136 B1
(45) Date of Patent: Jan. 12, 2021

(54) APPARATUS FOR ASSISTANCE IN PUTTING ON AND REMOVING FOOTWEAR

(71) Applicant: Robert A. Deane, Encinitas, CA (US)

(72) Inventor: Robert A. Deane, Encinitas, CA (US)

( * ) Notice: Subject to any disclaimer, the term of this patent is extended or adjusted under 35 U.S.C. 154(b) by 0 days.

(21) Appl. No.: 16/741,629

(22) Filed: Jan. 13, 2020

(51) Int. Cl.
*A47C 7/50* (2006.01)
*A43B 11/00* (2006.01)
*B64D 11/06* (2006.01)
*A47C 7/52* (2006.01)
*A47C 9/00* (2006.01)

(52) U.S. Cl.
CPC ............ *A43B 11/00* (2013.01); *A47C 7/5062* (2018.08); *A47C 7/50* (2013.01); *A47C 7/506* (2013.01); *A47C 7/5064* (2018.08); *A47C 7/5066* (2018.08); *A47C 7/5068* (2018.08); *A47C 7/52* (2013.01); *A47C 9/005* (2013.01); *B64D 11/0643* (2014.12)

(58) Field of Classification Search
CPC ..... A47C 7/506; A47C 7/5062; A47C 7/5064; A47C 7/5066; A47C 7/5068; A47C 9/005; A47C 7/50; A47C 7/52; B64D 11/0643
See application file for complete search history.

(56) References Cited

U.S. PATENT DOCUMENTS

| | | | |
|---|---|---|---|
| 967,452 A | 8/1910 | Silverman | |
| 2,658,640 A | 11/1953 | Silverman | |
| 2,888,977 A | 6/1959 | Bayles | |
| 2,986,201 A * | 5/1961 | McCartan | A47C 7/506 297/423.31 |
| 3,068,047 A * | 12/1962 | Schliephacke | A47C 1/0347 297/88 |
| 3,087,757 A * | 4/1963 | Hyman | A47C 7/506 297/423.28 |
| 3,820,844 A | 6/1974 | Fortnam | |
| 4,165,124 A | 8/1979 | Olan | |
| 4,765,684 A * | 8/1988 | Kvalheim | A47C 9/005 297/313 |
| 4,767,160 A | 8/1988 | Mengshoel et al. | |
| 5,039,167 A * | 8/1991 | Sweet | A47C 1/04 297/423.28 |
| 5,277,477 A * | 1/1994 | Sharff | A61G 5/12 297/313 |
| 5,374,102 A * | 12/1994 | Archambault | B60N 2/062 297/301.6 |
| 5,520,436 A | 5/1996 | Rader et al. | |
| 5,779,316 A * | 7/1998 | Sugawa | A47C 7/506 297/423.26 |
| 5,992,935 A * | 11/1999 | Duijnstee | B66B 9/08 297/344.21 |
| 6,036,268 A * | 3/2000 | Larson | A47C 7/506 297/423.2 |
| 6,145,931 A | 11/2000 | Subotic | |

(Continued)

FOREIGN PATENT DOCUMENTS

CN 107183986 A 9/2017

*Primary Examiner* — Syed A Islam
(74) *Attorney, Agent, or Firm* — The Maxham Firm; Lawrence Maxham (57) ABSTRACT

Apparatus to facilitate putting on and removing footwear. The apparatus may be swivelably coupled to a chair where handles are provided to rotate an arm which is coupled to a footrest. By moving the arm, which is at seat level, the footrest is movable between a stowed position and an operative, forward position.

11 Claims, 11 Drawing Sheets

(56) References Cited

U.S. PATENT DOCUMENTS

| | | | | |
|---|---|---|---|---|
| 6,692,078 B2* | 2/2004 | Pham | ............ | A47C 1/0342 |
| | | | | 297/423.19 |
| 6,979,284 B2* | 12/2005 | Curtis | ............ | A47C 9/002 |
| | | | | 297/217.1 |
| 7,036,887 B2 | 5/2006 | Kneier | | |
| 7,918,508 B2 | 4/2011 | Whalen | | |
| 8,746,802 B1* | 6/2014 | Delmestri | ............ | A47C 7/506 |
| | | | | 297/423.19 |
| 8,882,190 B2* | 11/2014 | Garland | ............ | A47C 7/506 |
| | | | | 297/85 L |
| 8,985,694 B2* | 3/2015 | Fischer | ............ | A47C 1/0355 |
| | | | | 297/423.19 |
| 9,549,615 B1* | 1/2017 | Su | ............ | A47C 7/506 |
| 9,609,949 B2* | 4/2017 | Lee | ............ | A47C 1/03 |
| 9,676,302 B2* | 6/2017 | Yang | ............ | A47C 7/52 |
| 10,456,308 B2* | 10/2019 | Ditor | ............ | A61G 5/128 |
| 2002/0060491 A1 | 5/2002 | Kneier | | |
| 2005/0225151 A1 | 10/2005 | Zenisek | | |
| 2014/0103691 A1* | 4/2014 | Boyd | ............ | A47C 9/007 |
| | | | | 297/344.18 |
| 2014/0123455 A1 | 5/2014 | Mishica | | |
| 2015/0305507 A1* | 10/2015 | Besler | ............ | A47C 7/506 |
| | | | | 297/423.28 |

* cited by examiner

APPARATUS FOR ASSISTANCE IN PUTTING ON AND REMOVING FOOTWEAR

FIELD OF INVENTION

This invention relates generally to a tool to facilitate donning and removing footwear, and more particularly to a mechanism for moving a footrest with respect to a chair for that purpose.

DISCUSSION OF THE PRIOR ART

There are many people who have difficulty in putting on and taking off socks and shoes or other types of footwear. The difficulty may result from reduced flexibility due to advancing age, or to body limitations from other physical issues.

A number of proposals have been made to assist people in these foot dressing and undressing endeavors. Many involve standing, with some bending, to use a long-handled shoehorn or wedge (long used to engage the heel portion of a shoe or boot to assist in removal from the foot). Maintaining upright stability while using these aids is challenging for many people. A simple stool can be used, but if the person has difficulty in bending while standing, a stool can be inadequate. Further, standing and lifting a foot onto a stool can be challenging for a person who is somewhat unsteady or has balance issues. Chairs and stools with fixed footrests have also been proposed.

A footrest of the type employed by a shoeshine person can be helpful, but it, too, has limitations. It is typically a removable device that is put in place after the user (person with shoes on their feet) has sat in the chair provided. That footrest is fixed in place, or is completely removed with no provision for easily moving it into operative position. Simple home shoeshine stools/boxes are available. For an able-bodied person, he can put one foot in place and shine his shoe. It is actually a different form of a one position, portable, footrest and does not facilitate use by a person of limited bending ability and possibly limited stability or balance ability to put on and take off footwear.

In some prior attempts to provide a structure to make dressing and undressing a person's feet as comfortable and as easy as possible, a stool has been provided that is manually pulled out from and returned to a home, or non-operative, position under a chair, for example. Such structures require as much or more bending as it does to use a stool by itself. The bending and balancing involved in many of the known devices could potentially compromise the safety of the user.

SUMMARY OF EMBODIMENTS OF THE INVENTION

The apparatus disclosed here provides a convenient, comfortable setup for a person to be seated and have a footrest in position for use, which footrest can be moved out of the way when not needed.

A mechanism is rotatably mounted to a chair and swivelably or slidably coupled to the footrest to enable the footrest to be deployed to a functional position by means of a lever, and returned to a stowed position by reverse movement of the lever, all while the user is stably seated and requiring a minimum arm effort.

In a preferred embodiment the chair has a back and arms. The arms are to assist the user in sitting and in standing, while the chair back provides both safety and comfort functions.

Sitting, instead of standing, increases stability and adds leverage for completing the task of independently putting on and taking off shoes and socks. Furthermore, sitting and elevating the foot onto a stool or step provides the optimum in comfort, balance, and safety.

The apparatus described herein provides a comfortable seat and an easy-to-deploy footrest so that users may more easily and safely complete their shodding and unshodding tasks.

BRIEF DESCRIPTION OF THE DRAWING

The objects, features, and advantages of the apparatus will be more clearly perceived from the following detailed description, when read in conjunction with the accompanying drawing, in which.

DETAILED DESCRIPTION OF EMBODIMENTS OF THE INVENTION

Figure 1:
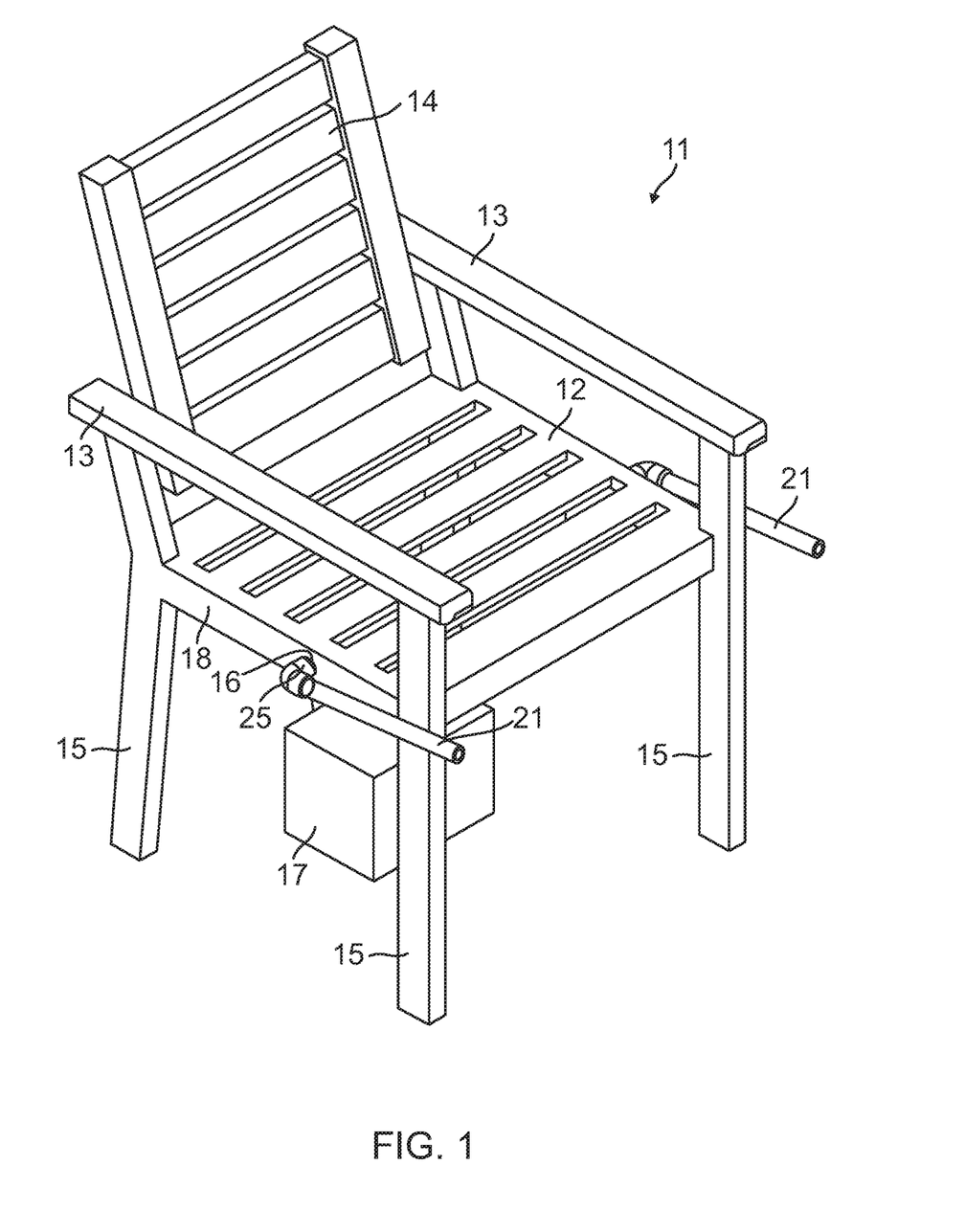
FIG. 1 is a perspective view of apparatus according to an embodiment of the invention showing an example of a footrest in stowed position.
Figure 2:
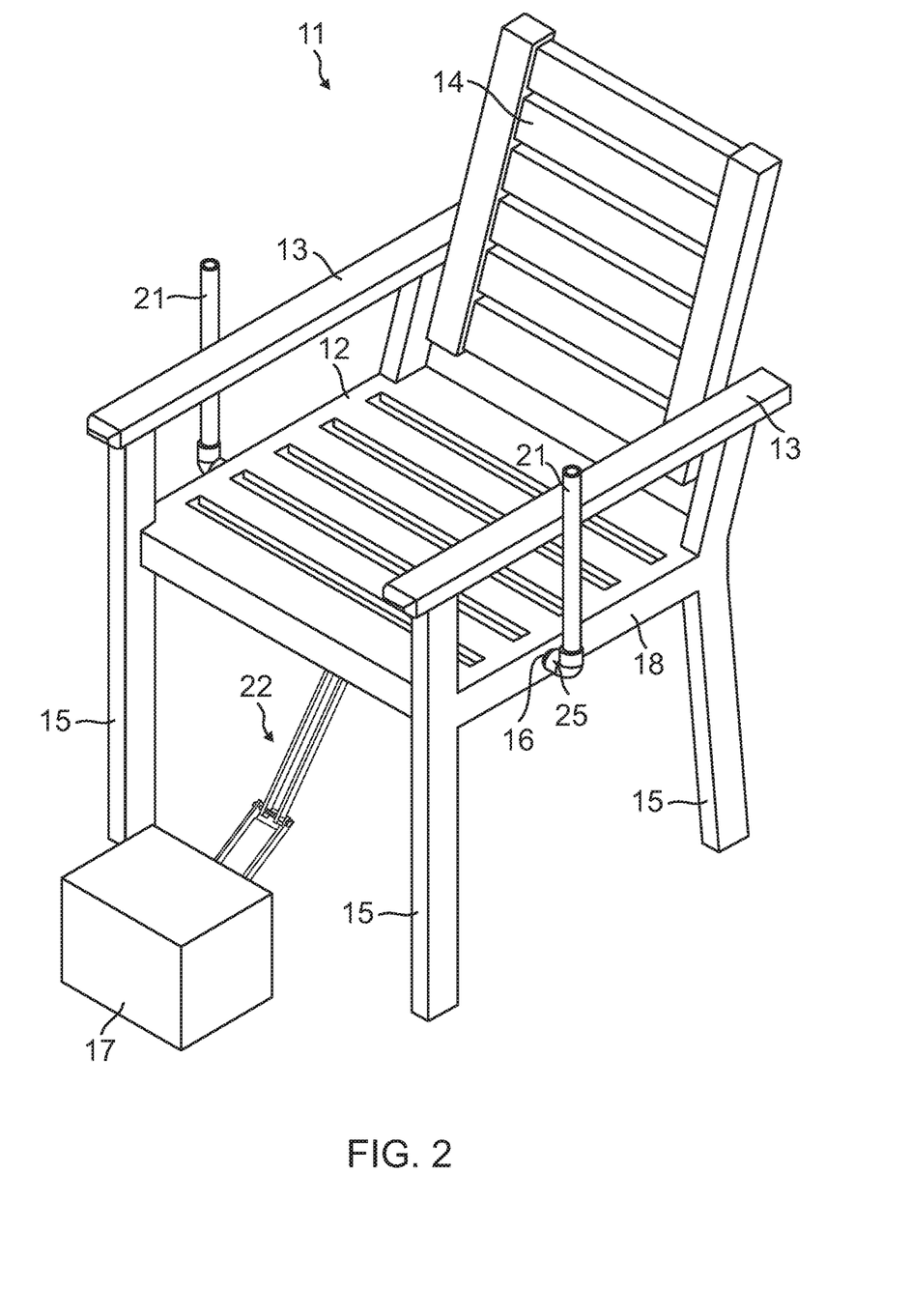
FIG. 2 is an opposite side perspective view of the apparatus of FIG. 1 with the footrest in extended or functional position.

With reference now to the drawing, and more particularly to FIGS. 1 and 2 thereof, chair 11 is shown, having a seat 12, seat rails 18, arms 13, back 14, and legs 15. Beneath the chair is footrest 17 which is operatively connected to actuating handles or levers 21 by mechanism 22. As can be seen in FIGS. 1 and 2, when handles 21 are generally horizontal, footrest 17 is in the retracted, or stowed position. When the handles are rotated upwardly as shown, footrest 17 is extended forwardly of the chair to an operative, or functional position. The footrest is shown here schematically for exemplary purposes.

Figure 3:
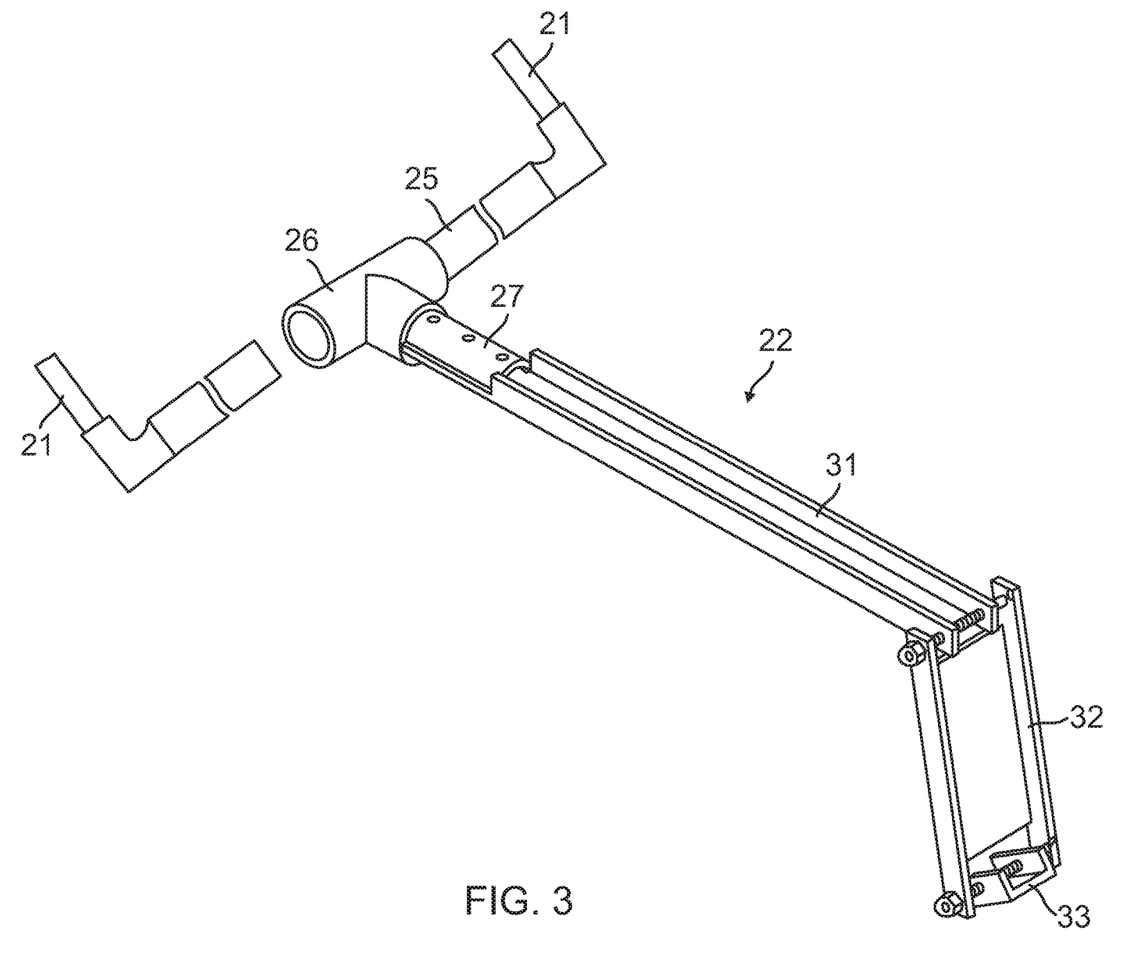
FIG. 3 is a perspective view of the mechanism coupling the handles of FIGS. 1 and 2 with the footrest.

An example of mechanism 22 is shown in FIG. 3. Pipe or rod 25 is connected to handles 21. Rod 25 is rotationally mounted to chair 11 through holes 16 in the bottom of rail 18 of chair seat 12, as shown in FIGS. 1 and 2, as an example. T-shaped connector 26 is formed with an extension 27 which is coupled to elongated arm 31. Arm 31 is swivelably coupled to first bracket 32 which is, in turn, swivably coupled to bracket 33. Bracket 33 would be secured to footrest 17, 41, 51. Connector 26 need not have an extension 27 and can be connected directly to arm 31.

The lengths of arm 31 and first bracket 32 are not fixed, but arm 31 must be shorter than the distance from the bottom of the chair seat to the floor.

Figure 5A:
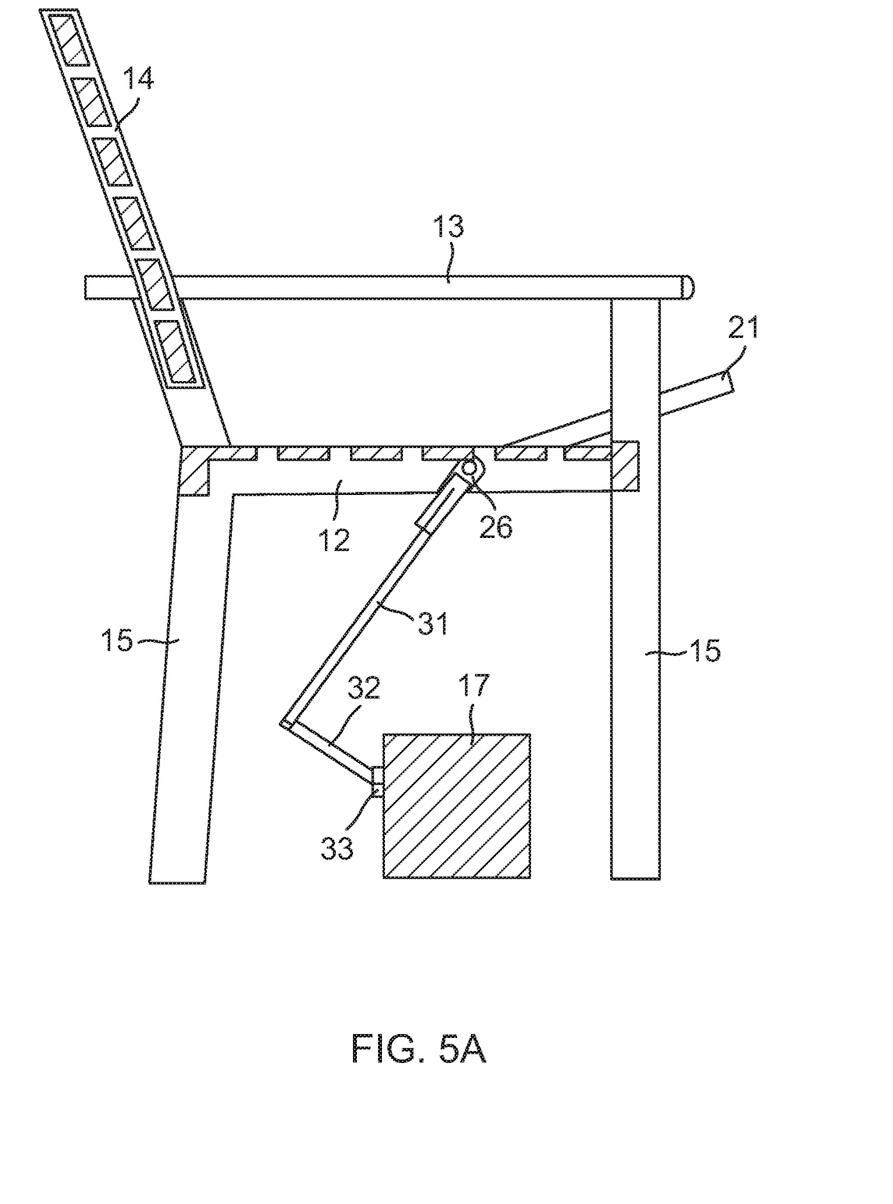
FIG. 5A is a side sectional view of the FIGS. 1 and 2 embodiment with the footrest in stowed position.
Figure 5B:
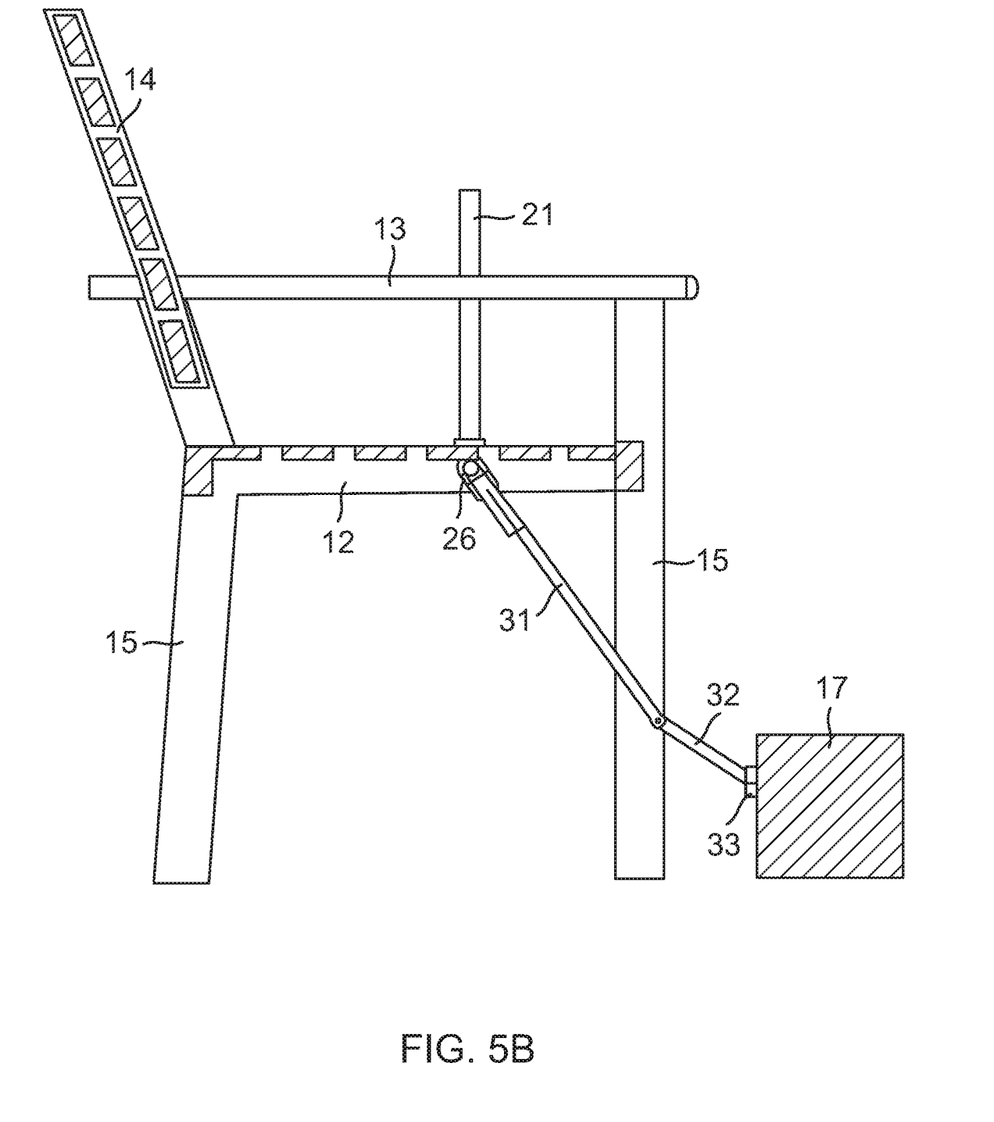
FIG. 5B is a side sectional view of the FIGS. 1 and 2 embodiment with the footrest in functional position.

It can easily be seen from FIGS. 1, 2, 3, and 5 that moving handle 21 from the generally horizontal position to the generally vertical position moves footrest 17 to the extended, or forward position, as seen in FIGS. 2 and 5B. Since bracket 32 is coupled to arm 31 at one end in the FIGS. 1, 2, and 5 embodiment, and to bracket 33 at its other end, both in an articulated manner, it is easily seen how an approximately 90° movement of handles 21 moves footrest 17 from the stowed position to the extended, or operative position, and vice versa.

Figure 4A:
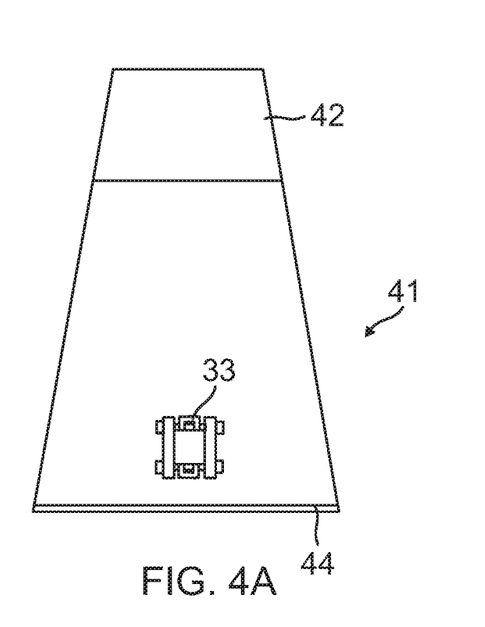
FIG. 4A is a front view of a preferred footrest in place of the simple box footrest of FIGS. 1 and 2.
Figure 4B:
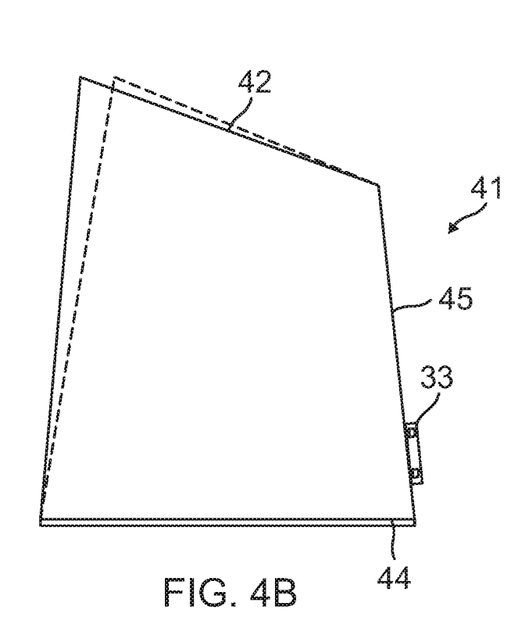
FIG. 4B is a side view of the footrest of FIG. 4A.
Figure 4C:
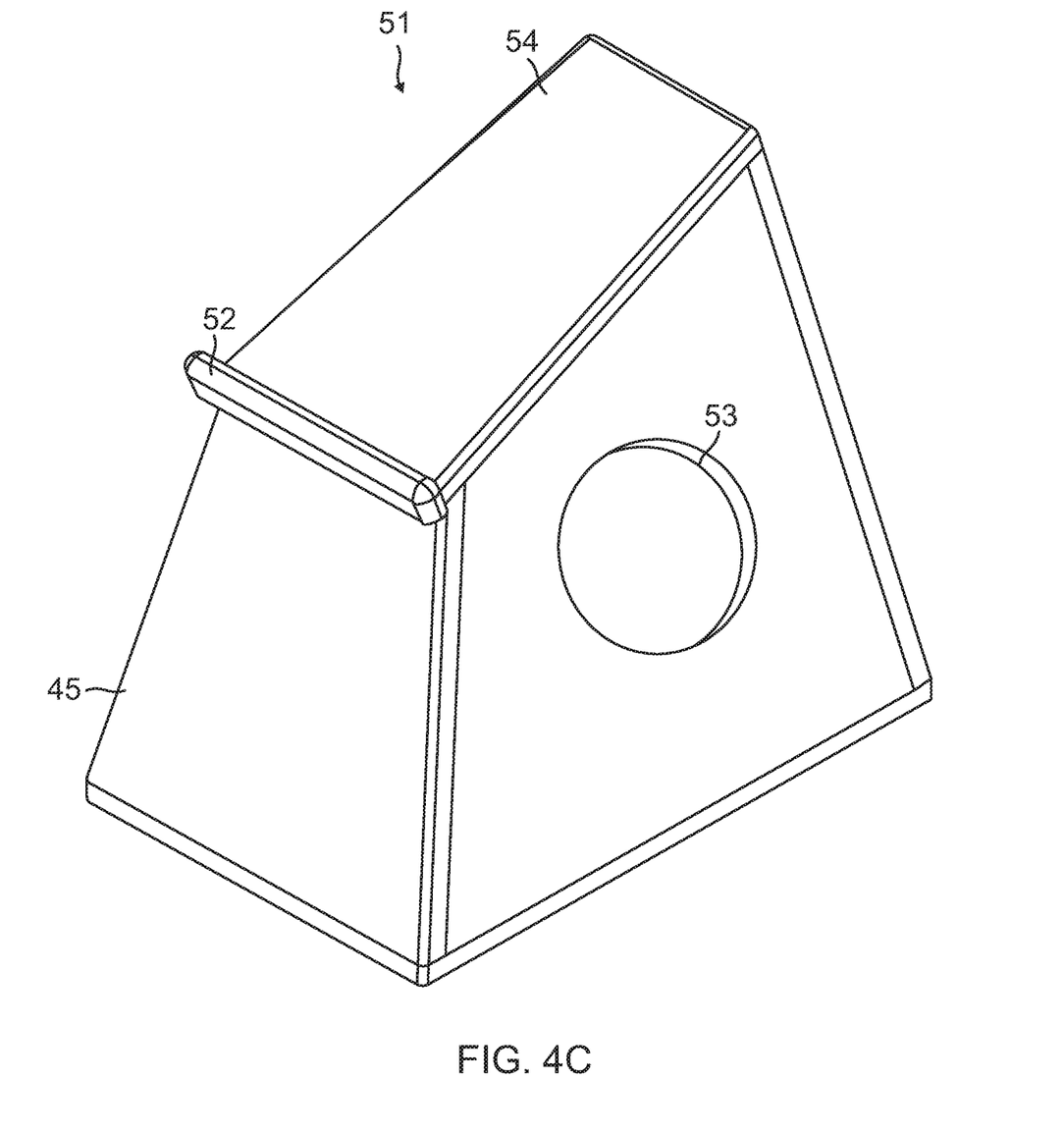
FIG. 4C is a perspective view of an alternative embodiment of the footrest of FIGS. 4A and 4B.

As shown in FIGS. 1, 2, 5, and 6, footrest 17 is shown schematically as a box. The footrest can have different shapes and FIG. 4 shows a preferred embodiment. The embodiment of FIGS. 4A, 4B, and 4C shows footrest 41 as having a trapezoidal shape from the user's viewpoint. The top surface 42 facing the user is sloped at an angle to provide comfort for the user's foot. As shown by the broken line in FIG. 4B, the angle can be less or greater than the basic angle shown.

As an optional or alternative embodiment, FIGS. 4A and 4B shows a glide sheet 44 covering the bottom surface of the footrest. This could be some sort of low friction plastic or other material that facilitates sliding of the footrest between the stowed and the operative positions over any type of floor or ground surface.

Another alternative or optional footrest embodiment is shown in FIG. 4C. Here, footrest 51 is formed with a ridge 52 to act as a healstop, for example. Hole 53 in the side is for ease of handling and provides access to the hollow inside of the footrest for storing items as desired. Such a hole could be in one side only, or in both sides. The angle of top surface 54 is similar to the angle of top surface 42 in FIGS. 4A and 4B. Also the generally trapezoidal shape is shown in FIG. 4C but that shape is not a requirement. The overall shape shown provides a wide base for stability and a convenient angle for the user's foot.

Figure 6:
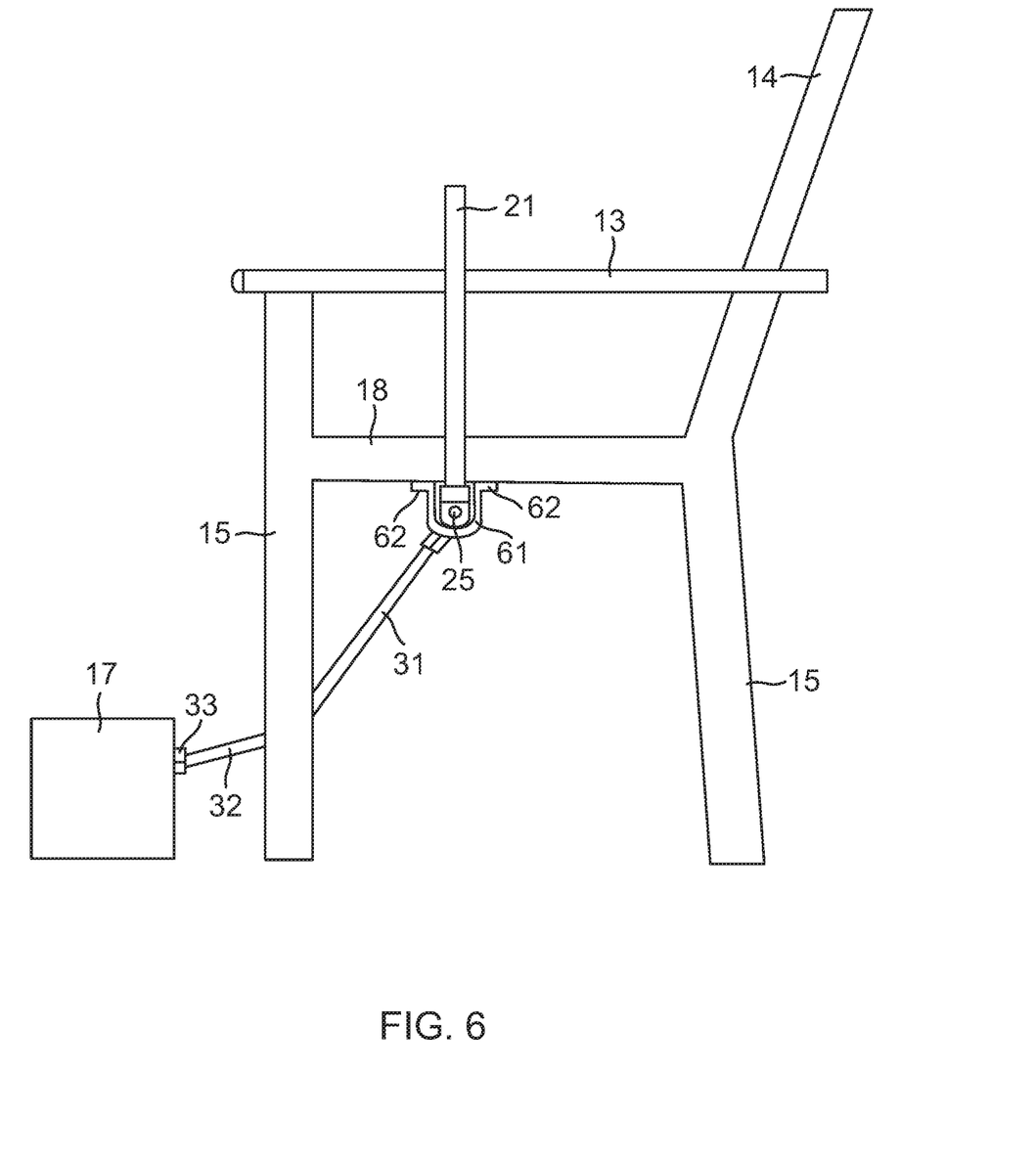
FIG. 6 is a side view of an alternative embodiment to the apparatus of FIGS. 1 and 2.

Another alternative embodiment is shown in FIG. 6. While the embodiment of FIGS. 1, 2, and 5 shows bar 25 being rotatably mounted through holes 16 in the chair seat rails 18, not all chairs are made of an appropriate material, such as wood, metal, or plastic, which have sufficient space under the seat for bar 25 to be rotatably mounted through holes 16 and to extend across from one side to the other. In FIG. 6, U-shaped bushing 61 is attached to the underside of seat 12 or seat rail 18, and bar 25 extends from one side of the chair to the other, as before, clear of the bottom of the chair seat. Flanges 62 may be employed to mount bushing 61 to seat 12 or seat rail 18 such as by screws or nails, for example.

Two approaches for mounting the mechanism of FIG. 3 to a chair are shown in FIG. 1 and FIG. 6, respectively. There are several ways the FIG. 3 mechanism could be rotatably mounted to a chair. Instead of at a location at or under the chair seat, as shown, the mechanism could be mounted at or in the chair back or at or through the foot or back legs, or even coupled to the chair arms. Of course, modifications to the FIG. 3 mechanism may be required, but the concept and operation would be essentially the same.

Any chair may be combined or incorporated with the footrest and the mechanism of the figures. However, the footrest and mechanism could be retrofitted to a chair. It would, therefore, be sold separately. Further, although the chair shown in the figures includes arms 13, they are not necessary. For comfort of the user, and for use in sitting down and rising from the chair, arms are preferred.

The mechanism of FIG. 3 is shown with two operating handles 21. However, the rotation (see FIGS. 1 and 2) of either handle accomplishes the desired movement of the footrest so the mechanism can be fully functional with a single handle 21.

Figure 2A:
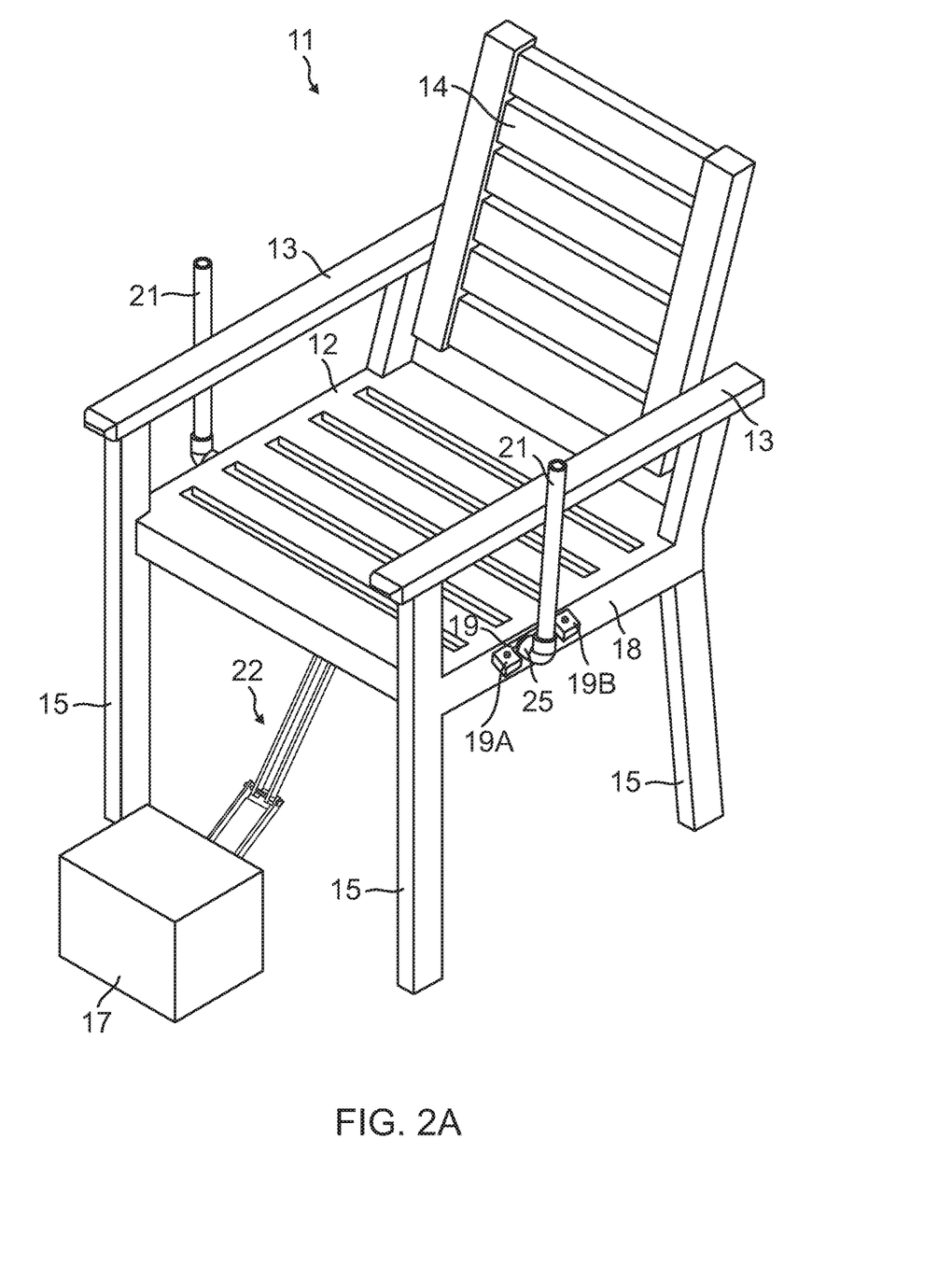
FIG. 2A is a perspective view, similar to FIG. 1, of alternative rotational connection of the rotational arm and the chair seat.

As another alternative or optional embodiment, stop element 19 having projections 19A and 19B in FIG. 2A can be provided to prevent handle 21 from rotating too far forward or back (or up or down). Handle 21 engages projection 19B when the footrest is moved forward and engages projection 19A when the footrest is moved back to the stowed position. Stop element 19 can be mounted on either or both sides of the chair.

Figure 7A:
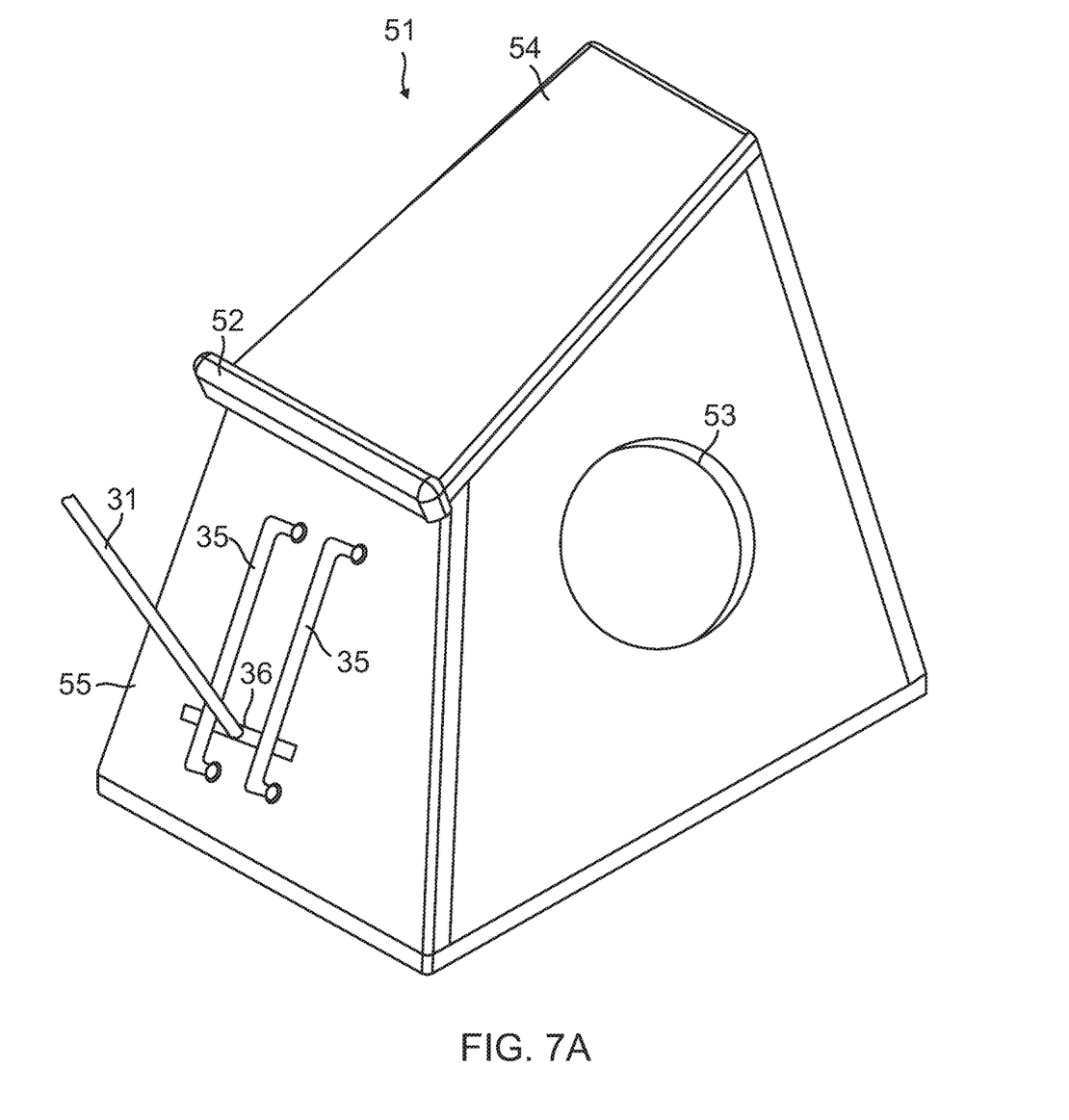
FIG. 7A shows a perspective view of an alternative operative coupling from the handles to the footrest.
Figure 7B:
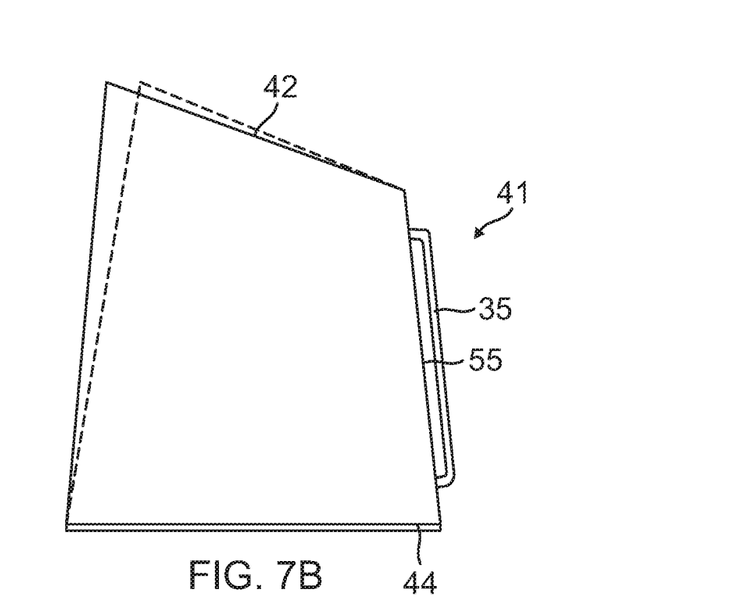
FIG. 7B is a side view of the embodiment of FIG. 7A.
Figure 7C:
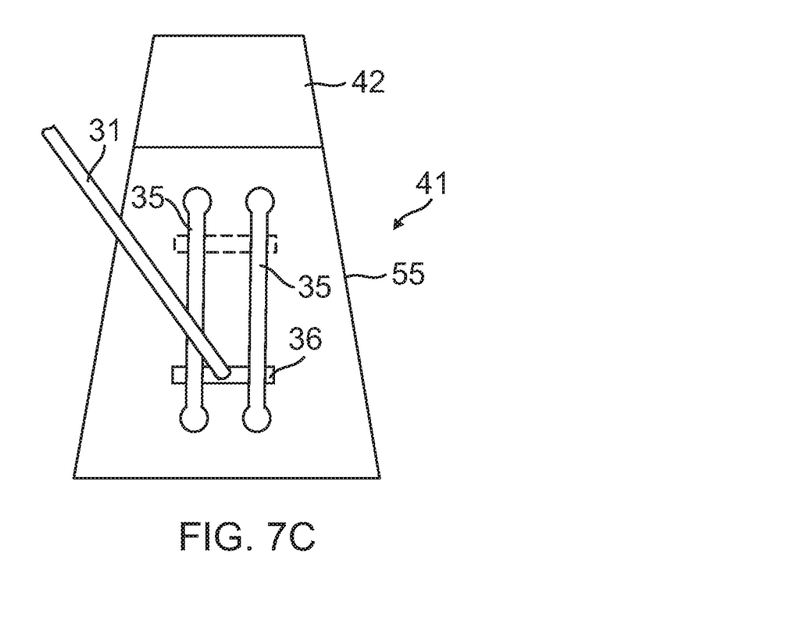
FIG. 7C is a view of the embodiment of FIG. 7A from the user's point of view.

An optional, alternative embodiment of the coupling from arm 31 to the footrest is shown in FIG. 7. In place of bracket 32 and bracket 33, the distal end 36 of arm 31 is T-shaped, and is positioned under and laterally of spaced slider rails 35 which are mounted on side 45, 55 of footrest 41, 51. In this simple form, parallel rails 35 are secured to the footrest as shown and end 36 is slidingly deployed between the rails and side 55 of the footrest. When arm 31 is rotated back down to move the footrest to the stowed position, end 36 is at the position shown in FIG. 7A. When handles 21 are rotated upwardly, the lower end of arm 31 moves up the rails and moves the footrest forward, as indicated by the broken lines in FIG. 7C. The contact surfaces between the rails and end 36 could be anything which facilitates sliding, even small rollers or slidable coating, such as PTFE. FIG. 7B is a side view of the footrest of FIG. 7A and FIG. 7C is the front view facing the user.

It is an intention that the apparatus described and shown herein be relatively simple and easy to operate by a seated person. Also that it makes certain daily dressing functions easier, or even possible at all, for the person with limited mobility, balance, bendability, or other limitations.

What is claimed is:

1. Apparatus to facilitate putting on and removing footwear by a user, the apparatus comprising:
   a chair having a seat, arm rests, and legs supporting the seat above a surface upon which the chair is supported, the legs being in direct contact with the surface;
   a movable footrest slidably supported on the surface, said footrest having a slope angled downwardly toward the chair to receive the user's feet above the surface at an angle and closer to the user to facilitate the user reaching their feet;
   a mechanism mounted to said chair and coupled to said footrest, said mechanism comprising:
      an elongated element rotatably mounted to said chair seat and extending beneath said chair seat;
      a handle secured to at least one end of said elongated element, said handle enabling said elongated element to be rotated through a limited arc; and
      a coupling mechanism having one end mounted to said elongated element and a second end coupled to said footrest;
   whereby movement of said handle results in sliding movement of said footrest from one position to a second position on the surface.

2. The apparatus of claim 1, wherein
   said one position may be either under said chair or extended forward from under said chair; and
   said second position may be extended forward from under said chair or be under said chair.

3. The apparatus of claim 1, wherein said elongated element extends outward from each side of said chair and a said handle is secured to each end of said elongated element.

4. The apparatus of claim 1, wherein said coupling mechanism comprises:
   an elongated arm with one end connected to said elongated element;
   an elongated first bracket to which a second end of said elongated arm is swivably connected; and
   a second bracket to which said first bracket is swivably connected, said second bracket being connected to said footrest.

5. The apparatus of claim 4, wherein said elongated arm is longer than said elongated first bracket.

6. The apparatus of claim 1, wherein said elongated element is mounted through holes in sides of said chair seat.

7. The apparatus of claim 1, and further comprising:
   bushings mounted beneath the sides of said chair seat; wherein
   said elongated element is rotatably mounted to said bushings.

8. The apparatus of claim 1, and further comprising a stop element mounted to said chair seat and configured to limit the rotational movement of said elongated element by engaging said handle.

9. Apparatus to facilitate putting on and removing footwear by a user when seated in a chair, the chair having a seat, arm rests, and having legs in direct contact with a surface and supporting the seat on the surface, the apparatus comprising:
   a movable footrest configured to be slidably supported on the surface, said footrest having a slope angled downwardly toward the chair to receive the user's feet above the surface at an angle and closer to the user to facilitate the user reaching their feet;
   a mechanism for being mounted to said chair and coupled to said footrest, said mechanism comprising:
      an elongated element for being rotatably mounted to and extending beneath the chair seat;
      a handle secured to at least one end of said elongated element, said handle enabling said elongated element to be rotated through a limited arc; and
      a coupling mechanism having one end mounted to said elongated element and a second end coupled to said footrest;
   whereby movement of said handle results in slidable movement of said footrest from one position to a second position on the surface.

10. The apparatus of claim 9, wherein
    said one position may be either under the chair or extended forward from under the chair; and
    said second position may be extended forward from under the chair or be under the chair.

11. The apparatus of claim 9, wherein said elongated element extends outward from each side of the chair and a said handle is secured to each end of said elongated element.

* * * * *